July 5, 1960 J. H. THEDICK 2,944,122
REMOTE CONTROL MECHANISM FOR ADJUSTING THE IGNITION
TIMING OF AN INTERNAL COMBUSTION ENGINE
Filed July 25, 1958 2 Sheets-Sheet 1
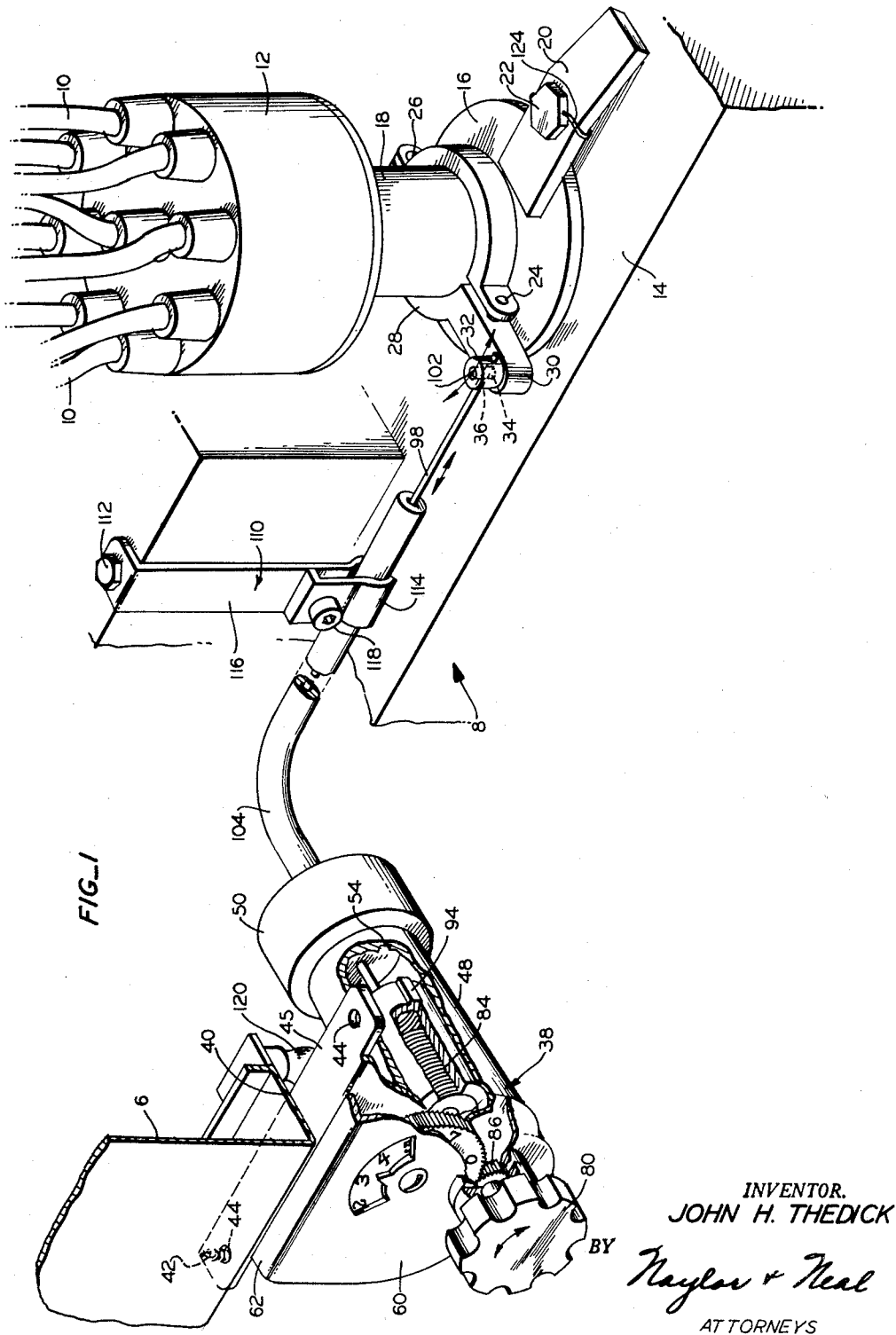
INVENTOR.
JOHN H. THEDICK
BY
Naylor + Neal
ATTORNEYS

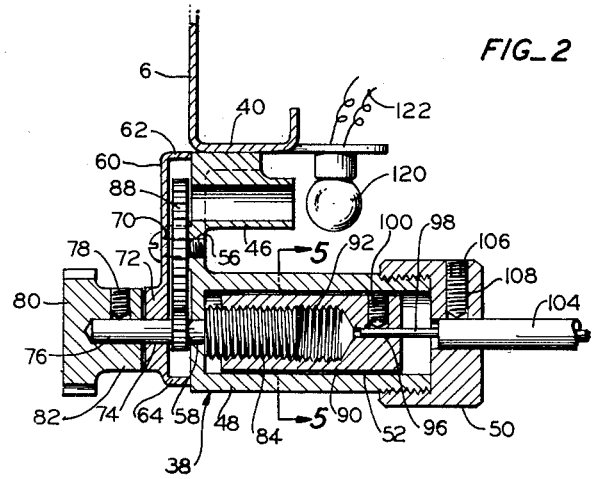
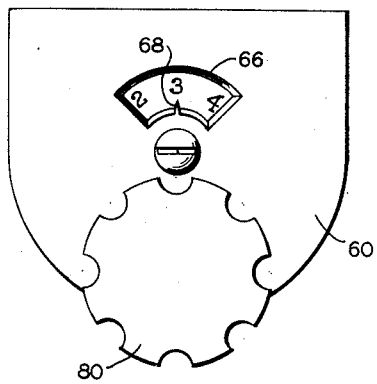
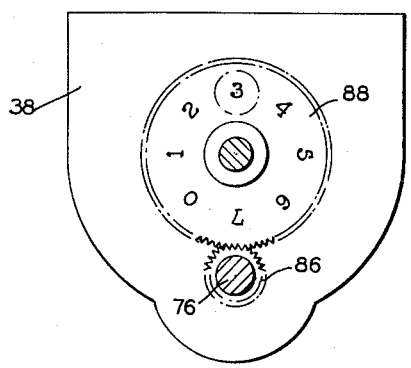

United States Patent Office 2,944,122
Patented July 5, 1960

2,944,122

REMOTE CONTROL MECHANISM FOR ADJUSTING THE IGNITION TIMING OF AN INTERNAL COMBUSTION ENGINE

John H. Thedick, 1781 Arthur St., Klamath Falls, Oreg.

Filed July 25, 1958, Ser. No. 751,055

11 Claims. (Cl. 200—31)

This invention relates to ignition timing of automobile engines, and more particularly, to a remote control system for selectively adjusting the ignition timing of such engines from the driver's seat of the automobiles.

Modern high compression engines are subject to variations in performance and efficiency when operating at different altitudes. This is particularly true with respect to those engines which operate at compression ratios of 10 to 1 or higher. Thus engines properly timed for one particular operating altitude when called upon to operate at lower altitudes may develop "ping" caused by pre-ignition in the engine cylinders arising from the increased atmospheric pressure and compression ratio incident to such operation. The reverse is similarly true, an engine with its ignition adjusted for sea level operation, i.e., with its spark retarded, will at higher altitudes operate at reduced levels of performance and efficiency. These variations in engine performance and efficiency are especially important to the driver who frequently operates his car or truck at a variety of altitudes, and it is accordingly an object of this invention to provide remote control means for adjusting the ignition timing of an internal combustion engine to obtain optimum performance and efficiency therefrom, said means being well adapted for installtion within the driver's cab of a car or truck or other vehicle for convenient manual operation.

It is another object of this invention to provide a remote control device for advancing or retarding the spark of an internal combustion engine, said device being provided with visual means for indicating the appropriate spark setting in accordance with the engine operating altitude.

Still another object is to provide a device of the character described for varying the timing of an internal combustion engine a predetermined selectable amount, said device being relatively simple as to design, manufacture and installation, and being of low cost.

Other objects and advantages of this invention will become apparent from the following description when taken in conjunction with the drawings in which:

Figure 1 is a view in perspective, partially broken away, illustrating a typical installation of the device of this invention;

Figure 2 is a view in section showing construction details of the device;

Figure 3 is a view in front elevation illustrating the manual control knob and the front plate with altitude indicator cut-out;

Figure 4 is a view in section showing the altitude selector dial and the drive means therefor; and Figure 5 is a view in section taken on the line 5—5 of Figure 2.

In Figure 1 is shown the instrument panel 6 of an automobile or other vehicle in which an internal combustion engine 8 of high compression type is installed. A plurality of leads 10 extend to the engine spark plugs (not shown) from the timer-distributor 12, which latter is secured atop the engine block 14 for rotation relative thereto through a flange 16 extending outwardly from the central shaft 18 of the timer-distributor 12 and a retaining bar 20 bearing thereon which is secured through a stud 22 turned down finger-tight and safety wired. Secured about the central shaft 18 of the distributor-timer 12 by means of screws 24 and 26 is a split clamp 28 having an outwardly extending arm 30 to which is pivotally secured a pin 32 having an internally threaded bore 34 concentric with its axis of pivot and a fine bore 36 perpendicular thereto.

As illustrated in Figures 1 and 2, a housing 38 is secured to a rearwardly extending flange 40 at the bottom of the vehicle instrument panel 6 through screws 42 passed through apertures 44 in the flange 45 of the housing. The housing 38 is provided at its upper end with an open-ended tubular light-directing portion 46, and has disposed therebeneath a larger tubular portion 48 externally threaded at its rearward end for receipt of a cap 50. The larger tubular portion 48 has a smooth bore 52 from which radially extends a rectangular keyway 54 running the length of the bore 52. Intermediate the upper and lower tubular portions 46 and 48 is a threaded screw receiving aperture 56, and concentrically disposed relative to the lower tubular portion 48 and in communication therewith is a bore 58.

A cover plate 60 is located at the front of housing 38 and is provided with rearwardly extending upper and lower flanges 62 and 64, which flanges serve to space the body of the cover plate 60 from the housing 38. Plate 60 is provided with a segmental cut-out, or window, 66, an integral pointer 68, an aperture 70, a forwardly extending boss 72, and a bore 74.

Journalled for rotation in the bores 58 and 74 of the housing 38 and cover plate 60, respectively, is a shaft 76 having fixedly secured thereto through a set screw 78 at its forward end, a notched knob 80, the hub 82 of which is adapted to abut the front face of the boss 72. At the opposite or rearward end of the shaft 76 there is fixedly secured a screw 84 which extends within the bore 52, being concentrically disposed therein. Intermediate the ends thereof and fixedly secured to the shaft 76 in the space provided between the cover plate 60 and the housing 38 by the flanges 62 and 64 is a pinion 86 which is in mesh with a toothed indicator disc or gear 88, which gear is of a material such as plastic. Knob 80, screw 84 and pinion 86, through abutting engagement with the cover plate 60 and the housing 38, prevent any substantial axial movement of the shaft 76.

A cylindrical member, or plug, 90 is concentrically disposed within the bore 52, said plug having at its forward end a threaded recess 92 within which the screw 84 is threadably engaged for the purpose of effecting reciprocal movement of the plug within the bore 52. Rotation of the plug 90 is prevented by an outwardly extending rectangular tongue 94 which is integral with the plug and extends into the keyway 54. At the rearward end of the plug 90 is a concentrically disposed fine bore 96.

An elongated flexible shaft 98 extends between the plug 90 and the clamp 28, said shaft rod 98, at one end, projecting into bore 96 of plug 90 and being secured therein by set screw 100 and, at the other end, projecting into bore 36 of pin 32 and being secured therein by set screw 102. A flexible tubular housing 104 of a material such as spirally wound wire is disposed about the shaft 98 and extends for a substantial portion of the length thereof intermediate its secured ends. Retention of the housing 104 is effected through a set screw 106 extending through the bore 108 of cap 50. Intermediate support for the housing 104 and the shaft 98 disposed therein is provided by a clamp 110 secured to the engine block 14 through a stud 112. A shaped flanged member 114 removably secured to the flanged clamp support bar 116 by stud 118 permits easy installation and removal of the housing 104 and the shaft 98.

In operating this device, the driver manually rotates the knob 80, which is conveniently located adjacent other instruments near the steering column, to the desired altitude setting on the face of the indicator disc 88. As shown in Figure 4, numerals upon disc 88 number from 1 to 7, respectively designating 1,000 foot increments of altitude; thus the dial face represents altitudes from sea level to 7,000 feet. In practice this has been found a desirable range within which to provide for engine timing adjustment although other ranges may of course be provided for, as desired. By suitable graduation of the indicator dial the driver is relieved of the necessity of determining whether an advancing or retarding of the spark is necessary, a mere selection of the operating altitude being all that is required. In this connection of course altimeters commonly available for installation in cars and trucks would be of considerable aid in the altitude setting although the proper setting may be determined simply by observing the engine performance. The dial face is graduated so that a reduction in the indicated altitude would reflect a retarding of the spark and vice versa. As shown in Figures 3 and 4, clockwise rotation of knob 80 would effect spark advance with counterclockwise rotation effecting a retarding of the spark. For night illumination of the translucent disc 88, a bulb 120, energized through leads 122, is installed adjacent the rear end of tubular housing portion 46, the latter serving to direct the light through the disc toward the pointer 68 indicating the selected timer-distributor altitude setting.

With rotation of the knob 80, the shaft 76 is caused to rotate, in turn effecting rotation of pinion 86, disc 88, and screw 84. Plug 90, in threaded engagement with the screw 84, is thereupon caused to move within the bore 52 of tubular housing portion 48, the direction of movement of the plug 90, i.e., toward the front or the rear end of portion 48, of course being determined by the direction of rotation of the shaft 76. Shaft 98, fixedly secured to the plug 90, moves to effect rotation of the clamp 28, and rotative movement of the latter in turn effects rotation of the timer-distributor 12 to advance or retard the spark. The bar 20 yieldingly retains the timer-distributor 12 in its position of adjustment. Safety wire 124 prevents the stud 22 from vibrating loose from its bar-securing position.

It should be noted that the timer-distributor 12 is of a conventional type, and it is therefore believed unnecessary to go into the details or ramifications of its design. Suffice it to say that rotation of such a timer-distributor will effect an advance or retard of the spark of an internal combustion engine as is well known in the art.

From the above description it may be seen that this invention provides a convenient means of quickly and easily varying the timing of an engine from within the vehicle, and although its use is particularly advantageous where variations in altitude are encountered in engine operation, it is generally useful whenever advancing or retarding of spark within the limits of its operation is desired.

It will be appreciated that the embodiment of this invention as herein described may be altered, changed or modified without departing from the spirit or scope of the invention as herein claimed.

What is claimed is:

1. In a vehicle having an internal combustion engine provided with an ignition system including a timer-distributor adapted for rotatable timing adjustment, a device for adjusting the timing of said ignition system comprising in combination, a housing adapted for securing to the vehicle instrument panel and having a rearwardly extending tubular portion with a longitudinal keyway therein, a cover plate having rearwardly extending upper and lower flanges abutting said housing and disposing said plate in spaced relationship therewith, a shaft journalled for rotation in the cover plate and in the housing and having fixedly secured thereto at one end forwardly of the cover plate a manual control knob for effecting rotation thereof and at the other end a screw extending into said housing tubular portion, said shaft further having secured intermediate its ends in the space between said housing and cover plate a pinion gear, an internally threaded cylindrical plug adapted to be driven in reciprocal movement within said tubular housing portion through threaded engagement with the shaft and in response to rotation thereof, as manually effected through the manual control knob, rotation of the plug during such reciprocal movement being prevented by a tongue provided upon the plug and disposed in said tubular housing portion keyway, connecting means secured at one end to the plug and at the other end to said timer-distributor for effecting timing adjustment thereof, and means driven by said pinion gear for visually indicating the relation between the immediate timing condition of said ignition system and altitude.

2. The combination of claim 1, wherein said connecting means includes an elongated flexible shaft pivotally connected to a clamp through which rotation of the timer-distributor is effected.

3. The combination of claim 1, wherein said driven means includes a toothed disc disposed in the space between the housing and the cover plate, said disc being in mesh with said pinion and having indicia on its face representative of altitude.

4. A device for adjusting the timing of an internal combustion engine by effecting the rotation of the timer-distributor thereof comprising, in combination, a housing adapted for securing to a vehicle instrument panel and having a tubular portion, a cover plate secured to the front of the housing in spaced relationship therewith, a shaft journalled for rotation in the housing and cover plate and restrained against axial movement, said shaft having fixedly secured at one end a manually operable control knob and fixedly secured at the other end a screw, said screw extending into said tubular portion, a plug disposed for reciprocal movement within said tubular portion and operatively connected to the screw for movement in response to screw rotation, and connecting means secured to the plug for transmitting plug movement to the timer-distributor to effect rotation thereof, the rotation of the shaft and screw secured thereto in one direction, as manually effected through the knob, causing the plug to travel toward one end of the tubular portion to advance the timing of the engine by rotation of the timer-distributor through the connecting means, and rotation of said shaft and screw in the opposite direction causing said plug to travel toward the other end of the tubular portion to retard the engine timing by rotation of the timer-distributor in a direction opposite to that for timing advance.

5. The combination of claim 4, wherein a pinion is fixedly secured to the shaft intermediate the housing and cover plate, and rotatable indicator means for similarly disposed intermediate the housing and cover plate and operatively connected with said pinion for indicating the engine timing adjustment as effected through rotation of the shaft.

6. The combination of claim 5, wherein the indicator means comprises a translucent disc having on its face indicia viewable through a window cutout in the cover plate, and wherein means are provided for illuminating said disc from the rear through a light directing portion of the housing.

7. The combination of claim 4, wherein the connecting means includes a collar secured to the timer-distributor for rotation therewith, and an elongated flexible rod fixedly secured at one end to the plug and at the other end pivotally secured to the collar, rotation of the timer-distributor occurring in response to rotation of the collar as effected through the rod.

8. A device for advancing or retarding the spark of an internal combustion engine by rotative adjustment of its timer-distributor comprising in combination a rotatably mounted timer-distributor, a housing, screw means disposed within said housing adapted to be manually driven in rotation, means retaining said screw means against sliding movement in said housing, plug means disposed within the housing and operatively connected with the screw means for reciprocal movement in response to rotation of said screw means, and means interconnecting the plug means and said timer-distributor for adjusting the timer-distributor for effecting the advancing or retarding of the engine spark.

9. Timer-distributor control mechanism for selectively advancing or retarding the ignition timing of the engine of a ground vehicle from the driver's compartment of said vehicle in accordance with the altitude of operation of said vehicle, said mechanism comprising a flexible shaft having one end thereof connected to the timer-distributor and having the other end thereof positioned within said driver's compartment, means disposed in both the engine compartment and the driver's compartment of said vehicle supporting said shaft for reciprocal movement, means for converting linear movement of said shaft to rotative movement of said timer-distributor to effect advancing or retarding of the ignition timing, manually operable control means for said shaft, means mounting said control means for rotative movement and against sliding movement, and means interconnecting said manually operable control means with said other end of said shaft and operable to convert rotative movement of said control means to linear movement of said shaft.

10. Timer-distributor control mechanism for selectively advancing or retarding the ignition timing of the engine of a ground vehicle from the driver's compartment of said vehicle in accordance with the altitude of operation of said vehicle, said mechanism comprising a flexible shaft having one end thereof connected to the timer-distributor and having the other end thereof positioned within said driver's compartment, means disposed in both the engine compartment and the driver's compartment of said vehicle supporting said shaft for reciprocal movement, means for converting linear movement of said shaft to rotative movement of said timer-distributor to effect advancing or retarding of the ignition timing, manually operable and rotatively mounted control means for said shaft, means interconnecting said manually operable control means with said other end of said shaft and operable to convert rotative movement of said control means to linear movement of said shaft, and visual indicator means and means mounting the same within said driver's compartment, said indicator means being connected to said rotatively mounted control means and being adapted to indicate the altitude of operation of said vehicle for any given setting of said timer-distributor.

11. In combination with a timer-distributor which is mounted for rotative adjustment in support means disposed within the motor compartment of a vehicle and which is effective when rotatively adjusted to selectively advance or retard the ignition timing of the motor of said vehicle, means in holding engagement with said timer-distributor operable to prevent accidental rotative movement and to permit forced rotative movement of said timer-distributor, control mechanism for rotatively adjusting said timer-distributor comprising a lever arm secured to said timer-distributor and extending radially therefrom, a flexible shaft having one end connected to said lever arm and having the other end positioned within the driver's compartment of said vehicle, manual control means connected to said other end of said shaft for imparting two-way longitudinal movement to said shaft to thereby rotate said lever arm and effect rotative adjustment of said timer-distributor, and indicator means connected to said manual control means and driven thereby, said indicator means being positionally co-ordinated with the position of rotative adjustment of said timer-distributor to provide visual indication of the altitude of operation of said vehicle for any given setting of said timer-distributor.

References Cited in the file of this patent

UNITED STATES PATENTS

| | | |
|---|---|---|
| 1,216,745 | Starker | Feb. 20, 1917 |
| 1,431,599 | Schmid et al. | Oct. 10, 1922 |
| 1,570,680 | Kent | Jan. 26, 1936 |
| 1,601,976 | Mayer | Oct. 5, 1926 |
| 1,616,082 | Garrett | Feb. 1, 1927 |
| 1,641,442 | Kroeger | Sept. 6, 1927 |
| 1,666,639 | Cadieux | Apr. 17, 1928 |
| 2,021,166 | Bickel | Nov. 19, 1935 |
| 2,107,470 | Crawford et al. | Feb. 8, 1938 |
| 2,814,698 | Miller | Nov. 26, 1957 |
| 2,820,858 | Tompkins | Jan. 21, 1959 |